United States Patent
Lehman (10) Patent No.: US 10,190,508 B2
(45) Date of Patent: Jan. 29, 2019

(54) FILTER PRE-FILL DETECTION SYSTEM AND METHOD

(71) Applicant: Caterpillar Inc., Peoria, IL (US)

(72) Inventor: Martin A. Lehman, Congerville, IL (US)

(73) Assignee: Caterpillar Inc., Deerfield, IL (US)

( * ) Notice: Subject to any disclaimer, the term of this patent is extended or adjusted under 35 U.S.C. 154(b) by 72 days.

(21) Appl. No.: 15/355,003

(22) Filed: Nov. 17, 2016

(65) Prior Publication Data

US 2018/0135575 A1   May 17, 2018

(51) Int. Cl.

| | |
|---|---|
| *F02M 37/22* | (2006.01) |
| *F02D 19/02* | (2006.01) |
| *F02M 37/18* | (2006.01) |
| *B01D 35/143* | (2006.01) |
| *F02D 33/00* | (2006.01) |
| *B01D 29/60* | (2006.01) |
| *F02D 41/24* | (2006.01) |
| *F02D 41/22* | (2006.01) |

(52) U.S. Cl.
CPC ......... *F02D 19/025* (2013.01); *B01D 35/143* (2013.01); *B01D 35/1435* (2013.01); *F02M 37/18* (2013.01); *F02M 37/22* (2013.01); *B01D 29/606* (2013.01); *B01D 2201/54* (2013.01); *B01D 2201/56* (2013.01); *F02D 33/003* (2013.01); *F02D 41/2435* (2013.01); *F02D 2041/224* (2013.01); *F02M 2037/226* (2013.01)

(58) Field of Classification Search
CPC ............ F02D 19/025; F02D 2041/224; F02D 2041/225; F02D 2041/226; B01D 35/143; B01D 35/1435

USPC .............. 123/510, 511; 73/114.38, 114.42, 73/114.43, 114.57; 340/451; 702/183, 702/184, 185

See application file for complete search history.

(56) References Cited

U.S. PATENT DOCUMENTS

| | | | |
|---|---|---|---|
| 5,899,193 A | 5/1999 | Betz et al. | |
| 6,269,801 B1 | 8/2001 | Channing | |
| 6,484,127 B1 * | 11/2002 | Langervik | F01M 11/10 340/451 |
| 6,817,343 B1 | 11/2004 | Greco et al. | |
| 6,977,583 B2 * | 12/2005 | Gornick | F01M 11/10 123/196 S |
| 8,151,770 B2 * | 4/2012 | Kawashima | F01N 3/0253 123/516 |
| 8,155,861 B2 | 4/2012 | Lenz et al. | |
| 8,210,826 B2 * | 7/2012 | Freeman | F02D 19/12 417/18 |
| 8,920,648 B2 * | 12/2014 | Thomas | B01D 29/21 210/235 |

(Continued)

FOREIGN PATENT DOCUMENTS

DE    10214204 A1   10/2003

*Primary Examiner* — Sizo Vilakazi
*Assistant Examiner* — Kevin R Steckbauer
(74) *Attorney, Agent, or Firm* — Jonathan F. Yates (57) ABSTRACT

A system for detecting a pre-fill status of a fuel filter in a fuel system includes a monitoring mechanism structured to monitor a fluid property of the fuel system indicative of priming. A control mechanism is coupled with and structured to received data from the monitoring mechanism, and outputs a signal responsive to a time to prime the fuel system that is indicative of a filter pre-fill state.

20 Claims, 4 Drawing Sheets

(56) References Cited

U.S. PATENT DOCUMENTS

| | | | | |
|---|---|---|---|---|
| 8,968,565 B2* | 3/2015 | Thomas | ................ | B01D 29/21 210/235 |
| 9,133,783 B2* | 9/2015 | Slaymaker | ............ | F02D 41/065 |
| 9,316,187 B2* | 4/2016 | Saler | ................ | F02M 37/0052 |
| 9,732,689 B2* | 8/2017 | Slaymaker | ............ | F02D 41/065 |
| 2005/0062596 A1* | 3/2005 | Gornick | ................ | F01M 11/10 340/457.4 |
| 2007/0240649 A1* | 10/2007 | Freeman | ................ | F02D 19/12 123/1 A |
| 2010/0212641 A1* | 8/2010 | Kawashima | .......... | F01N 3/0253 123/516 |
| 2010/0213115 A1* | 8/2010 | Thomas | ................ | B01D 29/21 210/235 |
| 2012/0180765 A1* | 7/2012 | Saler | ................ | F02M 37/0052 123/516 |
| 2013/0238226 A1* | 9/2013 | Slaymaker | ............ | F02D 41/065 701/113 |
| 2014/0322030 A1* | 10/2014 | Stiles, Jr. | ............ | F04D 15/0066 417/12 |
| 2015/0001144 A1* | 1/2015 | Thomas | ................ | B01D 29/21 210/234 |
| 2015/0328568 A1* | 11/2015 | Verdegan | .............. | F01N 11/002 702/34 |
| 2015/0343348 A1* | 12/2015 | Morris | .................... | G01L 13/00 210/90 |
| 2016/0003178 A1* | 1/2016 | Slaymaker | ............ | F02D 41/065 701/113 |
| 2016/0369794 A1* | 12/2016 | Pribanic | .............. | B01D 35/143 |

* cited by examiner

FILTER PRE-FILL DETECTION SYSTEM AND METHOD

TECHNICAL FIELD

The present disclosure relates generally to combustion engine fuel systems and, more particularly, to detecting pre-filling of a fuel filter based upon a time to reach a priming state in a fuel system.

BACKGROUND

Combustion engines using various fuels, and notably diesel fuel, often utilize a common rail fuel system, where pressurized liquid fuel is delivered to a common rail that supplies the fuel to a plurality of fuel injectors. Common rail fuel systems may be relatively sensitive to particulate contamination. Even fine particles present in high-pressure fuel pumps, injectors, and other components can damage the system or diminish system performance. Particulates can be present in a fuel system for a variety of reasons, including contamination in the fuel itself or debris dislodged from engine components due to wear or as a result of various other physical and/or chemical processes. Servicing also provides various opportunities for contaminants to be introduced into the system. For example, if the fuel system undergoes maintenance, often fuel must be drained and components must be inspected, cleaned, and/or replaced. Unfiltered fuel may have a variety of contaminants such as wax, asphaltines, rust or dirt. High pressure fuel systems may be especially sensitive to contaminants due to tight clearances, high pressures, and the rapid speed of moving parts. If contaminants are not removed before entering a high pressure side of the fuel system, they may cause rapid wear and failure of fuel system components such as the fuel injector plungers and barrel as well as control valves. Minimum clearances in fuel injectors may be less than 2.5 microns in some instances, meaning microscopic particles can cause scratching and scuffing and potentially valve seizure. Further, contaminants may erode the mating parts of control valves, resulting in poor sealing. To address these and other concerns, fuel filters are positioned at various locations within the system and swapped out for fresh filters at periodic service intervals. Such routine maintenance as well as repairs may require that fuel be drained from the system, and then the drained fuel replaced and the system brought back up to pressure before the engine can be operated.

In a practical setting, reducing the time it takes to prime the fuel system may be seen as advantageous, especially for professionals as fuel system priming is a passive process that may require little to no action on the part of mechanics, vehicle owners, or other parties undertaking the maintenance or repair efforts. Rather than sitting idly by, persons working on fuel systems may attempt to hasten the priming process. One common technique for reducing the time it takes to prime the system is to fill the new filter with fuel, therefore diminishing the need for the system to be supplied with additional fuel and hastening the speed with which the fuel system can be made ready for service for various reasons. Pre-filling a new filter with fuel, however, can introduce unfiltered fuel to a "clean side" of the fuel system and cause particulates to be introduced into the system, thereby increasing the possibility of damaging or diminishing performance. U.S. Pat. No. 9,316,187 to Saler et al. sets forth a system for priming a diesel fuel engine in which a fuel monitoring mechanism may be used to detect the presence of fuel at a fuel filter. While this and other solutions may allow for fuel detection, no mechanism for detecting, calculating, or otherwise sensing activities that likely introduce unfiltered fuel appears known.

SUMMARY OF THE INVENTION

In one aspect, a fuel system includes a fuel supply, a fuel conduit for delivering fuel from the fuel supply to an engine, a pump, a fuel filter positioned fluidly between the pump and the fuel conduit, and a filter pre-filling detection system. The pump is coupled between the fuel supply and the fuel conduit and operable to pump fuel between the fuel supply and the fuel conduit to prime the fuel system. The filter pre-filling detection system may include at least one monitoring mechanism structured to monitor a property of the fuel system indicative of a start of priming the fuel system and a property of the fuel system indicative of an end of priming the fuel system. The filter pre-filling detection system may further include a control mechanism coupled with the at least one monitoring mechanism. The control mechanism may be structured to determine a time from the start of priming the fuel system to the end of priming the fuel system that is indicative of pre-filling of the fuel filter. The control mechanism my further be structured to produce an error signal responsive to the determined time indicative of pre-filling of the fuel filter.

In another aspect, a fuel filter pre-filling detection system for a pressurized fuel system includes at least one monitoring mechanism and a control mechanism. The at least one monitoring mechanism is structured to couple with the pressurized fuel system to monitor a property having a range of possible values indicative of a range of priming states of the pressurized fuel system. The control mechanism is coupled with the at least one monitoring mechanism and structured to determine a time to transition the pressurized fuel system from a first one of the priming states to a second one of the priming states. The control mechanism is structured to compare the determined time with an expected time to transition the fuel system from the first one of the priming states to the second one of the priming states, to determine a pre-fill state of a fuel filter in a pressurized fuel system based on a difference between the determined time and the expected time, and to generate a signal based at least in part upon the difference between the determined time and the expected time.

In still another aspect, a method of detecting a fluid filter fill state in a pressurized fluid system includes detecting a start of priming of the pressurized fluid system, determining an expected time to prime the pressurized fluid system, and detecting an expected time to prime the pressurized fluid system. The method further includes detecting an end of priming of the pressurized fluid system, determining an actual time to prime from the start of priming to the end of priming, and comparing the actual time to prime with the expected time to prime to detect a pre-fill state of a fluid filter in the pressurized fluid system.

DETAILED DESCRIPTION

Figure 1:
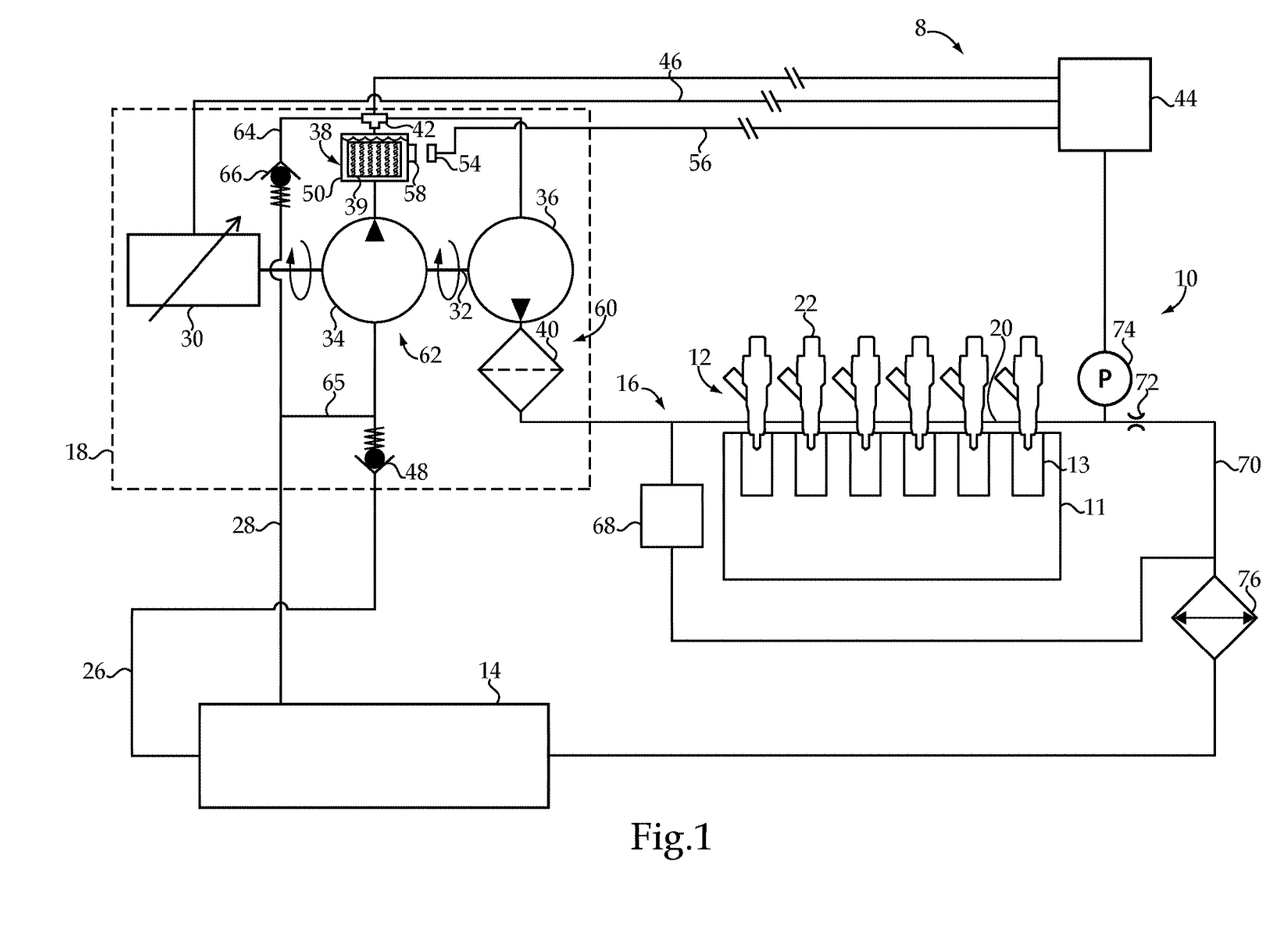
FIG. 1 is a diagrammatic view of an internal combustion engine having a pre-fill detection system, according to one embodiment.

Referring now to FIG. 1 a fuel system 8 including a filter pre-filling detection system 10 (hereinafter "detection system") according to one embodiment is shown. Fuel system 8 may be coupled with or part of an internal combustion engine 12 such as a diesel engine, and includes a fuel supply 14, and a fuel conduit 16 for delivering fuel from fuel supply 14 to engine 12. Engine 12 may include an engine housing 11 and engine cylinders 13 formed in engine housing 11. Fuel conduit 16 may include or have positioned therein a plurality of components structured to deliver fuel from fuel supply 14 to engine 12, including a fuel line 20 in the nature of a low pressure supply line or a high pressure common rail structured to convey liquid hydrocarbon fuel such as diesel distillate fuel to a plurality of fuel injectors 22, with each of the plurality of fuel injectors 22 positioned at least partially within one of engine cylinders 13 of engine housing 11 for direct injection of the fuel therein. The present disclosure may be employed in fuel systems not having a common rail such as mechanically actuated or hydraulically actuated unit injectors, and in engines having cylinders in a V-configuration, an in-line configuration, or any other configuration and may have any number of cylinders and fuel injectors. Fuel system 8 may also include a first pump 34 and a second pump 36. First pump 34 may be a low pressure impeller pump and second pump 36 may be a high pressure reciprocating piston or gerotor pump, for example. Fuel supply 14 may be fluidly coupled to first pump 34 by a fuel supply line 26 structured to provide fuel to a low pressure side 62 of fuel system 8. A fuel drain line 28 is structured to drain fuel from low pressure side 62 back to fuel supply 14.

First pump 34 may be coupled between fuel supply 14 and fuel line 20 and operable to pump fuel between fuel supply 14 and fuel line 20 for distribution to fuel injectors 22. References to a filter, as discussed below, should be understood to refer to any of a variety of filter types and filter locations in fuel system 8 or other fuel systems contemplated herein. Applications of the teachings herein to other types of pressurized fluid systems not relating to fuel are also contemplated. Fuel system 8 may also include a first fuel filter 38 and a second fuel filter 40 positioned between pump 34 and/or 36 and fuel line 20. First filter 38 might be a "coarse" fuel filter and a second fuel filter 40 might be a "fine" fuel filter, although the present disclosure is not limited as such. In the embodiment of FIG. 1, a modular pressurized fuel system housing 18 may package fuel system components such as a variable speed electrically powered pump motor 30, pump 34, pump 36, filter 38, filter 40, and a valve 42 together in a common housing. Other embodiments may not have a modular design, however, and/or may not include valve 42.

Fuel system 8 may be structured to draw fuel into fuel conduit 16 and to control fluid pressure in fuel system 8. Fuel system 8 of FIG. 1 may include motor 30 rotationally coupled with a pump shaft 32 structured to operate pump 34 and/or pump 36. Motor 30, which may be an electric variable speed motor, may be controllably energized, for example, by a control mechanism 44, such as a computer, thereby rotating pump shaft 32 and pumps 34, 36 coupled thereto. Control mechanism 44 may be communicatively coupled to motor 30 by a motor line 46. Motor 30 may be capable of being energized independent of engine 12, as motor 30 is not cam-actuated. Alternative embodiments might include a cam-driven system, however. Still other embodiments may be electric motor-driven but not modular as in the case of parts of fuel system 8 in the FIG. 1 embodiment.

First pump 34 may be structured such that rotation of pump shaft 32 may draw fuel from fuel supply 14, via fuel supply line 26, through a first check valve 48 structured to prevent reverse flow of fuel back towards fuel supply 14. In low-pressure side 62, fuel from pump 34 may flow to filter 38. Filter 38 may include a filter housing 50 and a filter medium 39 within filter housing 50. Filter 38 may further include a machine-readable identifier 58 resident thereon. In a practical implementation strategy, fuel system 8 may also include an electronic reader 54 for identifying the presence or type of filter 38 installed in fuel system 8. Reader 54 may be communicatively coupled with control mechanism 44 by a reader line 56. In the embodiment of FIG. 1, identifier 58 may be a radiofrequency identification (RFID) tag and reader 54 may be an RFID reader structured to identify and read RFID tags. Other embodiments may use different means of detecting, reading, or otherwise identifying the presence or type of filter 38, such as magnetic strips, barcodes, microchips, or the like, in each instance, the reader 54 structured to detect, read, or otherwise recognize and/or interpret identifier 58. In some embodiments, fuel system 8 may have multiple types of readers or no reader. In still other embodiments, filter 40 might additionally or alternatively have an identifier coupled or affixed thereto. Filters of varying design may have varying properties lending somewhat different properties to fuel system 8 such as expected priming time, as further discussed herein. Low pressure side 62 may also include a valve 42 structured to enable flow of fuel to a high pressure side 60 of fuel system 8 or alternatively recirculate fuel back in low pressure side 62 or return the fuel to fuel supply 14. A second check valve 66 is positioned fluidly between a fuel return or low pressure recirculation line 64 leading from valve 42 and a fuel drain line 28 leading to fuel supply 14. Additionally, a jumper line 65 may connect fuel supply line 26 and fuel discharge line 28.

Pump 36 may be structured such that rotation of pump shaft 32 may cause fuel to be pumped from low-pressure side 62 to high-pressure side 60 and to pump 36. From pump 36 fuel having been increased in pressure may be conveyed to and through filter 40. Fuel flowing out of filter 40 may be suitable for use in fuel line (or common rail) 20, fuel injectors 22, and other components of fuel system 8 and engine 12. In the embodiment of FIG. 1, some of the filtered fuel exiting filter 40 may be diverted to an exhaust filter regeneration system 68 for combustion of particulates trapped in an exhaust filter (not shown) coupled with engine 12. Fuel diverted to exhaust filter regeneration system 68 that is not used may be returned to fuel system 8 at a drain line 70 of fuel conduit 16. Draining of fuel from fuel line 20 through drain line 70 may pass through a flow restrictor 72.

Fuel system 8 may also be equipped to monitor a property of fuel system 8 indicative of fuel system 8 being primed. The property of fuel system 8 may be, for example, a fluid property of fuel in fuel system 8 such as fluid pressure, flow rate, fill volume, or potentially even a temperature property. The property of fuel system 8 may also be, for example, a state of a component of fuel system 8 such as running of motor 30. Even further, the property may be a change in a state of a component of fuel system 8 such as energization or de-energization of motor 30. In each case, fuel system 8 may be structured to monitor the property and control mechanism 44 may be structured to receive data indicative of the property. The monitoring may be exploited to determine a time to prime fuel system 8, which in turn can indicate a filter pre-fill state as further discussed herein. At least one fuel monitoring mechanism 74 (hereinafter "monitoring mechanism") structured and positioned to monitor a property of fuel system 8, such as a fluid property of fuel, indicative of fuel system 8 being primed may be positioned downstream of fuel line 20, and upstream of flow restrictor 72 in the illustrated case. A present state of a fluid property of fuel thusly monitored, or changes in the fluid property of fuel, may be indicative of a start of priming or an end of priming as further discussed herein. Monitoring mechanism 74 may be a sensor such as a pressure sensor including a pressure responsive membrane or surface, electrical conductor, or still other structure that is exposed to a fluid pressure of fuel in fuel system 8. In some embodiments monitoring mechanism 74 may be a flow meter structured to detect a flow or a flow rate of fuel through fuel conduit 16, potentially even a temperature sensor to detect the temperature or changes in temperature of fuel in fuel conduit 16, or any other type of sensor or sensor group structured to detect a fluid property of fuel indicative of priming of fuel system 8.

As used herein, the term "priming" should be understood to mean returning fuel system 8 to a state suitable for service, typically after experiencing a loss of pressure and fuel volume, and may include purging fuel conduit 16 of air. Monitoring mechanism 74 may be communicatively coupled with control mechanism 44, thereby allowing control mechanism 44 to receive data or any other form of information indicative of a property or a change in a fluid property of fuel in fuel conduit 16, which may be indicative of a priming state of fuel system 8. In alternative embodiments, detection system 10 may have two or more monitoring mechanisms, or monitoring mechanism 74 may have a different position in fuel conduit 16 than that which is illustrated. Fuel drained from fuel line 20 via drain line 70 may pass through a heat exchanger 76 fluidly positioned between fuel line 20 and fuel supply 14 before being carried back to fuel supply 14.

In addition to monitoring and/or determining a time to prime fuel system 8, determination of a time to transition fuel system 8 from a first priming state to a second priming state could be exploited within the present context to detect filter pre-filling. As used herein, the term "priming state" may be understood as any discrete and observable physical state of fuel system 8. A first priming state may be a beginning of actual priming and a second priming state may be an ending of the actual priming. For example, the first priming state may be an unprimed state and the second priming state may be a fully primed state. An actual time to prime may be the time it takes fuel system 8 to transition from the first priming state to the second priming state, which may be the entire time that it takes for fuel system 8 to prime. In other embodiments, the first priming state may occur after priming has begun but is not completed and the second priming state may occur after the occurrence of the first priming state but before priming is complete. A fully primed fuel system 8 might have a fluid pressure of several hundred kPa. Detection system 10 may be structured, however, such that the first priming state may be fuel system 8 having a first fluid pressure and the second priming state may be fuel system 8 having a second pressure. The priming time of interest may be the time that elapses between occurrence of the first fluid pressure and occurrence of the second fluid pressure. Put differently, the actual time to prime may be the time it takes to transition from a first priming state to a second priming state. In other embodiments, energization of the pump may be indicative of the start of priming while deenergization of the pump may be indicative of the end of priming Still other embodiments may utilize different methods of measuring or detecting the beginning, end, and progress of priming.

Figure 2:
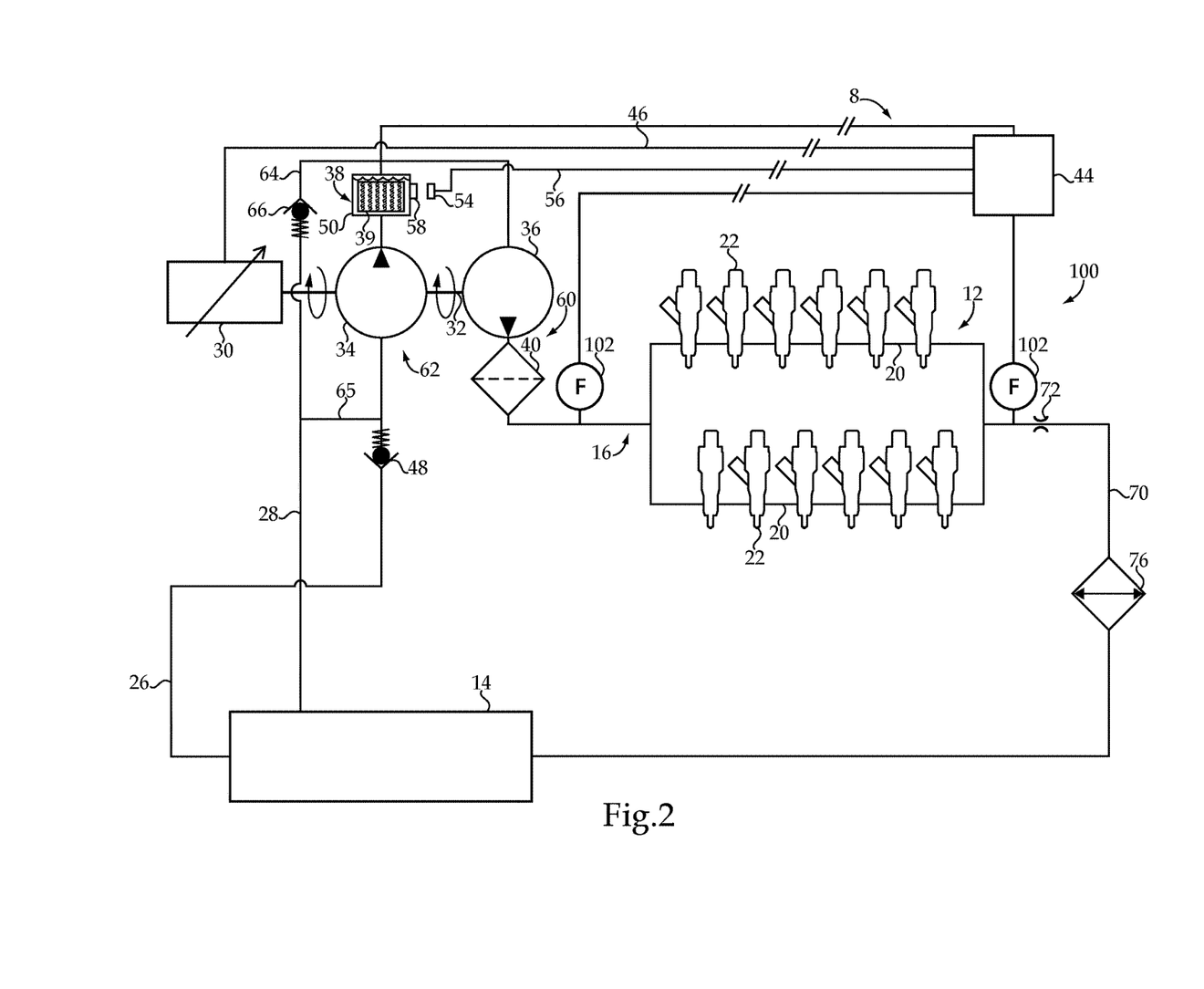
FIG. 2 is a diagrammatic view of an internal combustion engine having a pre-fill detection system, according to another embodiment.

Referring now to FIG. 2, an embodiment of a detection system 100 is illustrated in which the fluid property being detected by one or more monitoring mechanisms 102 is flow rate. The embodiment of FIG. 2 may be similar to the embodiment of FIG. 1 except that monitoring mechanism 102 may be a flow meter. Additionally, the embodiment of FIG. 2 might not make use of a modular design or an exhaust filter regeneration system. The embodiment of FIG. 2 also makes use of two parallel groups of fuel injectors 22. The embodiment of FIG. 2 includes two monitoring mechanisms 102, one upstream of two fuel lines 20 and one downstream of fuel line(s) 20 but upstream of flow restrictor 72. Both monitoring mechanisms 102 are communicatively coupled with control mechanism 44. Monitoring mechanisms 102 may be structured to detect or measure a flow or rate of fuel flow through fuel conduit 16, and could include a movable element such as a rotatable element exposed to a flow of fuel, a deflectable or deformable element, or still another apparatus. Though FIG. 2 shows two monitoring mechanisms 102, alternative embodiments may have only a single monitoring mechanism 102 or may have more than two monitoring mechanisms 102.

Figure 3:
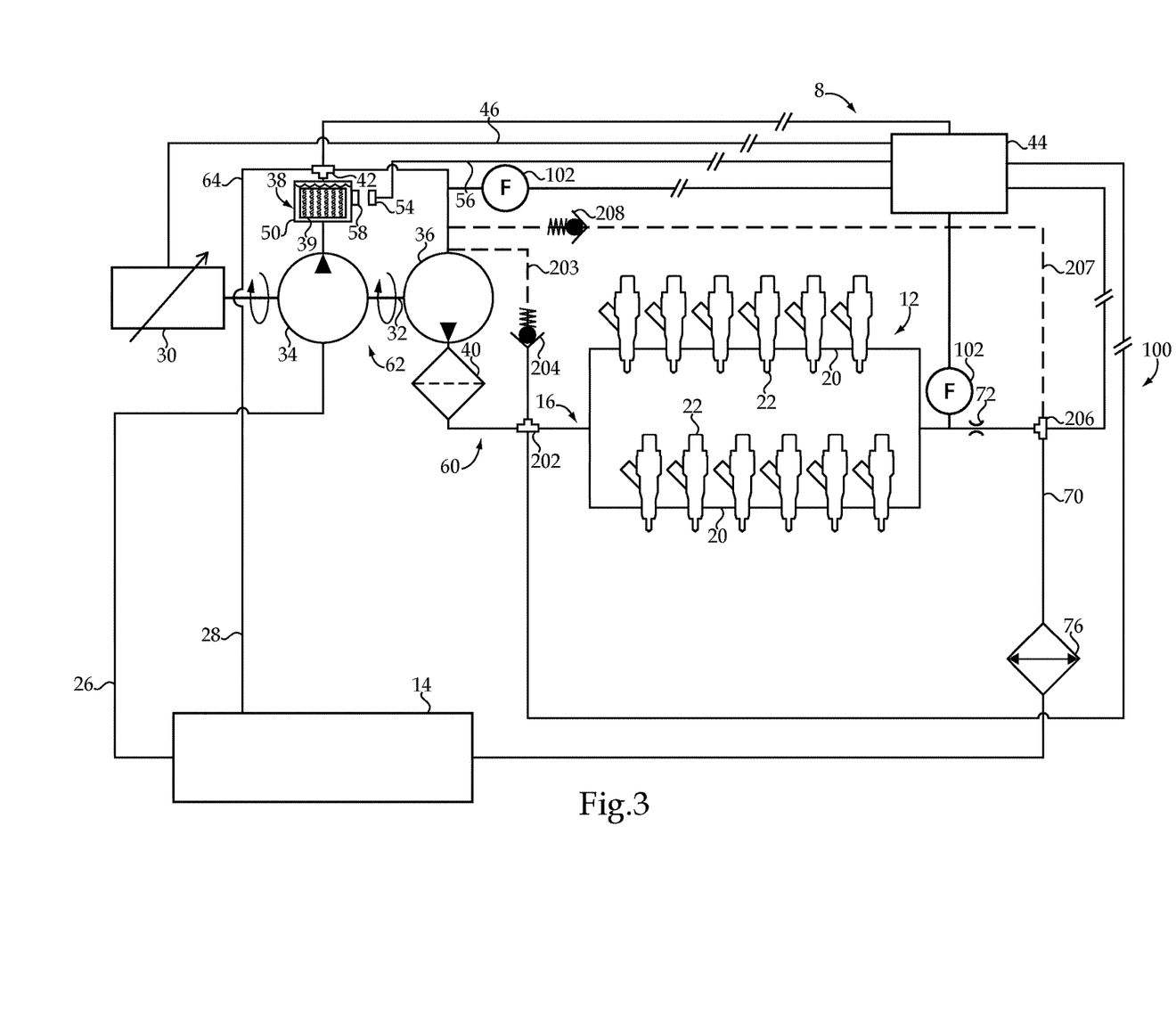
FIG. 3 is a diagrammatic view of an internal combustion engine having a pre-fill detection system, according to another embodiment.

Referring now to FIG. 3, an embodiment of a detection system 200 having an alternative fuel flow pattern as compared to the previously discussed embodiments is illustrated. In FIG. 3, fuel exiting filter 40 may be diverted such as by a valve 202 back to low pressure side 62 to be fed through pump 36 again. Fuel diverted by valve 202 to a first recirculation line 203 may pass through a check valve 204. Additionally or alternatively to the flow path through check valve 204 fuel passed through fuel line(s) 20 and flow restrictor 72 may be diverted via a valve 206 to a second recirculation line 207 through a check valve 208 back to low pressure side 62. The embodiment of FIG. 3 may also include one monitoring mechanism 102 positioned downstream of fuel lines 20 but upstream of flow restrictor 72, and another monitoring mechanisms 102 positioned on low pressure side 62 downstream of filter 38 but upstream of pump 36. The one or more monitoring mechanisms 102 in the FIG. 3 embodiment may include flow sensors although the present disclosure is not thereby limited. Either, both or neither of the fluid diversion pathways for recirculation of fuel could be employed in a practical implementation strategy.

Returning to FIG. 1, detection system 10 may be structured to detect a pre-filled fuel filter as noted above by way of control mechanism 44 being structured to determine an actual time to prime fuel system 8 that is indicative of installation or use of a pre-filled fuel filter. The determined time may be indicative of installation or use of a pre-filled filter when outside of an expected time to prime, or expected time, which may be the expected time from the start of priming fuel system 8 to the end of priming fuel system 8, or to otherwise transition fuel system 8 from a first priming state to a second priming state. Control mechanism 44 may be further structured to compare the determined time with the expected time and produce an error signal responsive to the determined time where the determined time is indicative of a pre-filled fuel filter. For example, if the expected time may range from 2-4 minutes and the determined time was 90 seconds, the determined time is less than the expected time, which may be indicative of use of a pre-filled fuel filter. In some embodiments the signal may include an alert signal that activates a perceptible alert device and/or encodes an error code that may be stored by control mechanism 44 or by another component of detection system 10. Engine operation could also be disabled unless and until the error code is cleared.

Control mechanism 44 may further be structured to command a system change in fuel system 8 responsive to the signal. For example, in one embodiment, control mechanism 44 may be structured to command a change in an energy state of at least one electrical actuator structured to change a fuel flow pattern within fuel system 8. In the embodiment of FIG. 1, control mechanism 44 may be communicatively coupled to valve 42 and structured to generate a signal that may energize an electrical actuator of valve 42, thereby causing fuel from filter 38 to be directed to low pressure recirculation line 64, and thereby preventing fuel from entering high pressure side 60. In another instance, the commanding of an electrical energy state or change in an electrical energy state could include commanding the state or change to a pump electrical actuator to start pumping, stop pumping, or maintain a present pumping state. It will therefore be appreciated that the detection of likely unfiltered fuel due to a pre-filled fuel filter can be addressed by recirculating fuel back through the filter again, and such a strategy could be implemented in various ways. It will also be recalled that installation of a pre-filled filter can introduce particulates to a clean side of a filter, hence, by recirculating the fuel back through the filter or returning it to the fuel tank introducing of the dirty fuel to downstream parts of the fuel system can be avoided. Rather than relying upon an electrically actuated valve such as valve 42 in other instances pump 36 might simply be turned off or maintained in an off state and not operated so that fuel pressure produced by pump 34 is sufficient to push fuel past check valve 66. Once pump 36 is turned on the fuel pumped by pump 34 can be conveyed downstream. Detection systems 100, 200 will generally operate analogously to the foregoing description albeit with different available fluid flow paths.

INDUSTRIAL APPLICABILITY

As discussed above, replacement of a fuel filter typically occurs while fuel system 8 is depressurized and at least partially drained. As such, fuel system 8 must be brought back up to pressure, or primed, after a new fuel filter has been installed. Priming typically consists of removing air from fuel conduit 16 and drawing fuel from fuel supply 14 into fuel conduit 16 until the fluid pressure and fuel volume in fuel system 8 has been restored. In a practical setting, the time it takes to prime fuel system 8 may often be viewed as an inconvenient or inefficient process as engine 12 is generally not operable until after priming has been completed. As noted above one common method of reducing the time to prime fuel system 8 may be pre-filling a fuel filter with fuel. If such a technique is employed when replacing filters 38 or 40, unfiltered fuel may pass to high pressure side 60 of fuel system 8. Accordingly, detection of a time to prime fuel system 8 indicative of a pre-filled fuel filter by detection system 10, 100, 200 can be advantageous.

Figure 4:
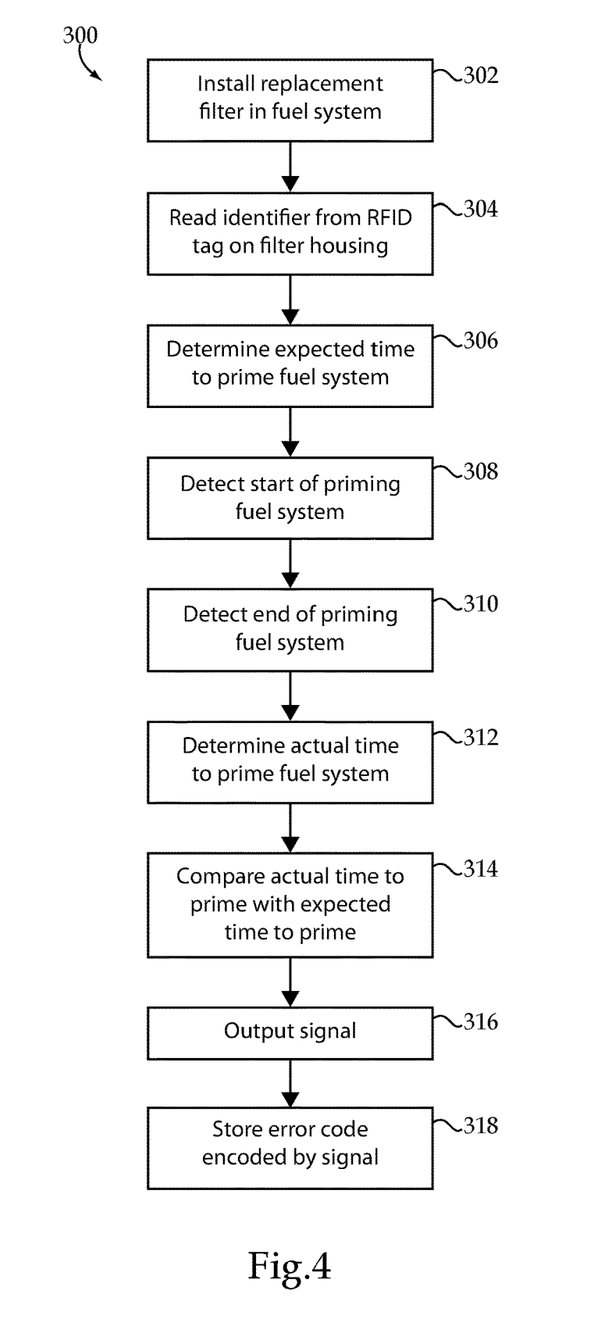
FIG. 4 is a flowchart illustrating a method for pre-fill detection, according to one embodiment.

Referring now to FIG. 4, a flowchart 300 setting forth methodology for detecting a fluid filter fill state in a pressurized fluid system is illustrated. The description of the methodology herein will discuss the embodiment of FIG. 1 but should be understood to apply to other embodiments as well. A replacement fuel filter may be installed in fuel system 8 at block 302. The replacement fuel filter may be new and unused, may be used, may be pre-filled, may not be pre-filled, or may be of any other state or configuration. Once installed in fuel system 8 at block 304 an electronic reader 54, as described herein, may detect or read an identifier 58 such as an RFID tag that may be affixed or coupled to a housing 50 of the installed filter. In some embodiments, filter housing 50 may instead have a different identifier 58 such as a magnetic code, computer chip configured to generate an identification signal, or any other type of identifier capable of being read or identified by reader 54. In still other embodiments, filter housing 50 may not have identifier 58. Detection system 10 may determine an expected time to prime the fuel system 8 at block 306. Control mechanism 44 may be structured to determine the expected time to prime fuel system 8 based on the type of fuel filter installed and/or potentially additional information stored in or readable by control mechanism 44.

When determining an expected time to prime fuel system 8, control mechanism 44 may run a query of a lookup table using an input indicative of the identifier 58 and find the appropriate entry indicative of the time to prime fuel system 8 using that fuel filter. For example, filter A may return expected time X, filter B may return expected time Y, and filter C may return expected time Z. It should be appreciated, however, that some embodiments may be configured to calculate the expected time to prime fuel system 8 based on the structure and configuration of fuel system 8. In embodiments not having a reader, not having the identifier, or embodiments in which the reader cannot read or detect the identifier, control mechanism 44 may be structured to determine the expected time to prime using only constant values reflective of the embodiment of the fuel system being primed, or rely upon a stored history of priming times of the subject fuel system.

The process of flowchart 300 may also include detecting the start of priming at block 308. In some embodiments, the start of priming may be the time when priming of fuel system 8 first begins while in other embodiments the start of priming may be another selected time, as described herein. In some embodiments, the start of priming may be when control mechanism 44 receives data from monitoring mechanism 74 indicative of a change in a fluid property in fuel system 8, or some other detected property or state. Detection of an end of priming fuel system 8 may occur at block 310. The end of priming may be the time at which priming ends as indicated by detection of a fluid property by monitoring mechanism 74 in fuel system 8, or some other detected property or state.

Once detection system 10 has detected the start of priming and the end of priming, the detection system 10 may determine an actual time to prime the fuel system at block 312. Control mechanism 44 may be structured to measure the actual time to prime through use of a timer or the like. Fuel system 8 may further be structured to compare the expected time to prime to the actual time to prime at block 314. Comparison of the actual time to prime with the expected time to prime may allow fuel system 8 to detect the fluid filter fill state. For example, if the actual time to prime is less than the expected time to prime, priming of fuel system 8 was faster than expected which may indicate that the filter was pre-filled. If comparison of the actual time to prime with the expected time to prime indicates that the filter was pre-filled, fuel system 8 may be structured to generate an output signal at block 316. In some embodiments, the output signal may encode an error code responsive to the detected actual time to prime being indicative of a fluid filter pre-fill state. The error code may be stored by control mechanism 44 so as to log the instance of a pre-filled fluid filter for later retrieval. In some embodiments, methodology may further include displaying the error code to the user of fuel system 8 or may generate an alert. In still other embodiments, the methodology may further include a control mechanism 44 structured to make changes to the fuel system responsive to the error code. For example, control mechanism 44 may be structured to change the flow of fuel through fuel system 8 or to disable an engine 12. In such an embodiment, a change responsive to the error code may include recirculating fuel in low pressure side 62 via low pressure recirculation line 64 so as to prevent unfiltered fuel from entering high pressure side 60 as discussed above.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. Other aspects, features, and advantages will be apparent from an examination of the attached drawings and appended claims.

What is claimed is:

1. A fuel system comprising:
    a fuel supply;
    a fuel conduit for delivering fuel from the fuel supply to an engine;
    a pump coupled between the fuel supply and the fuel conduit and operable to pump fuel between the fuel supply and the fuel conduit to prime the fuel system;
    a fuel filter positioned fluidly between the pump and the fuel conduit; and
    a filter pre-filling detection system including at least one monitoring mechanism structured to monitor a property of the fuel system indicative of a start of priming the fuel system and a property of the fuel system indicative of an end of priming the fuel system;
    the filter pre-filling detection system further including a control mechanism coupled with the at least one monitoring mechanism, the control mechanism being structured to determine a time from the start of priming the fuel system to the end of priming the fuel system that is indicative of pre-filling of the fuel filter with fuel, and to produce an error signal responsive to the determined time where the determined time is indicative of pre-filling of the fuel filter with fuel.

2. The fuel system of claim 1 wherein the fuel conduit includes a fuel line fluidly coupled to a plurality of fuel injectors.

3. The fuel system of claim 2 wherein the pump includes a first pump positioned fluidly between the fuel supply and the fuel line, and further comprising a second pump positioned fluidly between the first pump and the fuel line, and wherein the fuel filter is positioned fluidly between the first pump and the second pump.

4. The fuel system of claim 1 wherein the control mechanism is further structured to compare the determined time with an expected time from the start of priming the fuel system to the end of priming the fuel system, and to produce the error signal where the determined time is less than the expected time.

5. The fuel system of claim 4 further comprising a reader coupled with the control mechanism and structured to read an identifier resident on the fuel filter, and wherein the control mechanism is further structured to determine the expected time responsive to reading the identifier.

6. The fuel system of claim 5 wherein the reader includes an RFID reader structured to read an RFID tag of the fuel filter.

7. The fuel system of claim 1 wherein the property indicative of the end of priming includes a fluid property of fuel within the fuel system, and the at least one monitoring mechanism includes a sensor structured to monitor the fluid property of fuel within the fuel system.

8. The fuel system of claim 7 wherein the sensor includes a pressure sensor and the fluid property includes a pressure of fuel within the fuel conduit.

9. The fuel system of claim 7 wherein the sensor includes a flow meter and the fluid property includes a flow of fuel within the fuel conduit.

10. A fuel filter pre-filling detection system for a pressurized fuel system comprising:
    at least one monitoring mechanism structured to couple with the pressurized fuel system to monitor a property having a range of possible values indicative of a range of priming states of the pressurized fuel system;
    a control mechanism coupled with the at least one monitoring mechanism and structured to determine a time to transition the pressurized fuel system from a first one of the priming states to a second one of the priming states;
    the control mechanism being further structured to compare the determined time with an expected time to transition the fuel system from the first one of the priming states to the second one of the priming states, to determine a pre-fill state of a fuel filter in the pressurized fuel system based on a difference between the determined time and the expected time, and to generate a signal based at least in part upon the difference between the determined time and the expected time; and
    wherein in the pre-fill state, the fuel filter is pre-filled with fuel prior to installation in the pressurized fuel system.

11. The detection system of claim 10 wherein the at least one monitoring mechanism includes a sensor structured to monitor a fluid property of fuel in the pressurized fuel system.

12. The detection system of claim 11 wherein the sensor includes a pressure sensor structured to monitor a pressure of fuel in the pressurized fuel system.

13. The detection system of claim 11 wherein the sensor includes a flow meter structured to monitor a flow of fuel in the pressurized fuel system.

14. The detection system of claim 10 wherein the control mechanism generates the signal if the determined time is less than the expected time.

15. The detection system of claim 10 wherein the signal encodes an error code.

16. The detection system of claim 10 wherein the control mechanism is further structured to command a fuel system state or a change in a fuel system state responsive to the signal.

17. The detection system of claim 16 wherein the fuel system state or change in fuel system state includes an electrical energy state or a change in an electrical energy state of an electrical actuator affecting a fuel flow pattern within the pressurized fuel system.

18. A method of detecting a fuel filter fill state in a fuel system comprising:
    detecting a start of priming of a fuel system in an internal combustion engine;
    determining an expected time to prime the fuel system;
    detecting an end of priming of the fuel system;

determining an actual time to prime from the start of priming to the end of priming;

comparing the actual time to prime with the expected time to prime to detect a pre-filled state of a filter in the fuel system; and generating a signal responsive to the detected pre-filled state of the filter.

19. The method of claim 18 wherein the fuel system includes a pump positioned fluidly between a fuel supply and a fuel line coupled with a plurality of fuel injectors.

20. The method of claim 18 wherein the signal encodes an error code.

* * * * *